Figure 1:
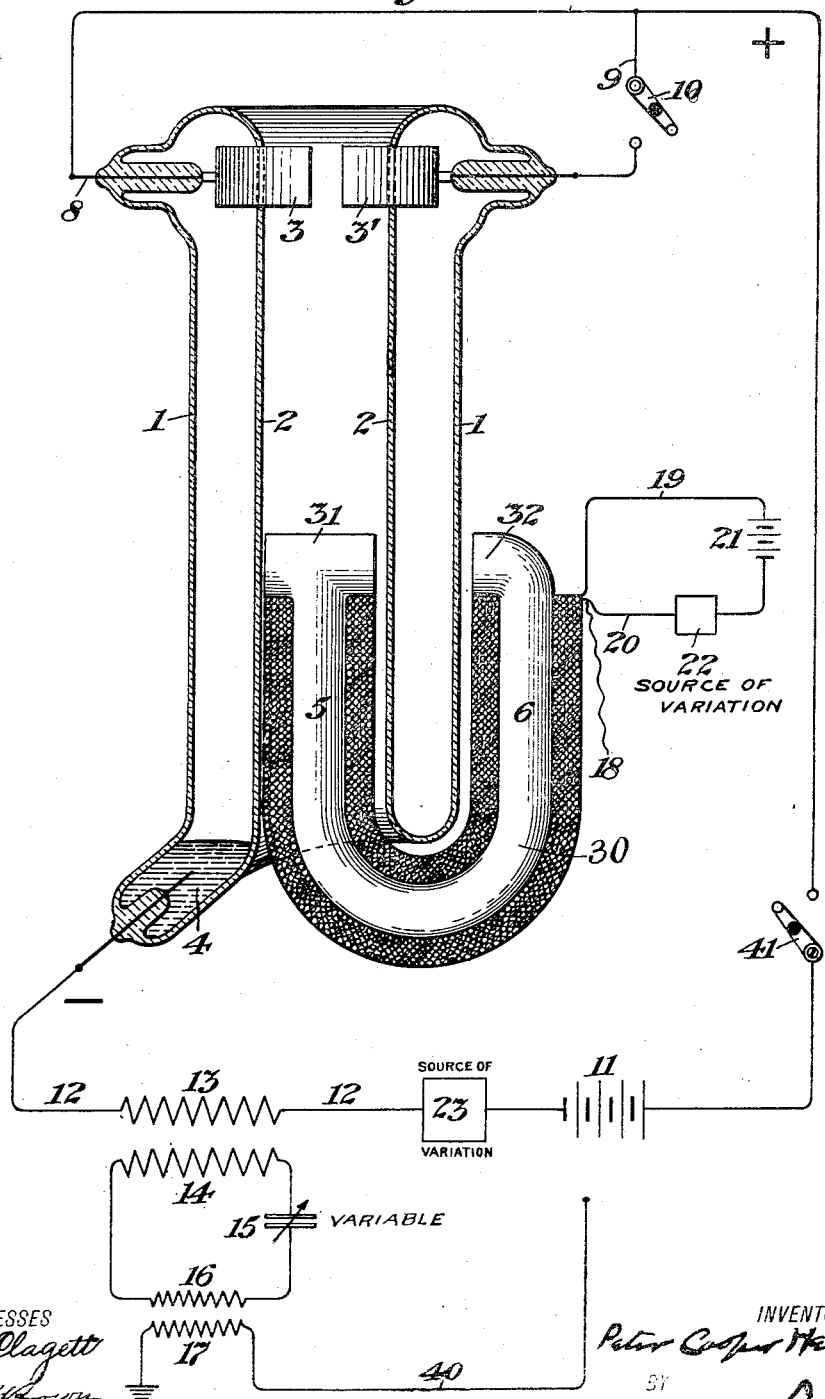

P. C. HEWITT.
SYSTEM OF ELECTRICAL DISTRIBUTION.
APPLICATION FILED DEC. 13, 1913.

1,295,499.
Patented Feb. 25, 1919.

UNITED STATES PATENT OFFICE.

PETER COOPER HEWITT, OF RINGWOOD MANOR, NEW JERSEY.

SYSTEM OF ELECTRICAL DISTRIBUTION.

1,295,499.   Specification of Letters Patent.   Patented Feb. 25, 1919.

Application filed December 13, 1913. Serial No. 806,364.

*To all whom it may concern:*

Be it known that I, PETER COOPER HEWITT, a citizen of the United States, and resident of Ringwood Manor, county of Passaic, State of New Jersey, have invented certain new and useful Improvements in Systems of Electrical Distribution, of which the following is a specification.

My invention relates to a system wherein periodic variations are produced by the mutual interaction of a conducting gas or vapor and magnetic lines of force. Applying such variations in a suitable manner to a circuit the system may be utilized in wireless telephony and telegraphy and for other purposes.

A mode of producing the primary variations is that of causing a movement of the current stream in the gas or vapor by the action of a field of force on the current stream whereby the effective impedance of the conducting gas or vapor is varied by the movement of the current stream.

Thus a variation of impedance to the passage of current is produced, as the movements of the current-carrying path succeed one another. In this way variations are produced in the electromotive-force required to pass current through the vapor path between the electrodes as the current performs its movement, and consequently variations of energy are produced which may be utilized either directly or intermediately or transferred to a receiving or utilizing circuit. The field may also be subjected by a special device or devices in its own circuit to variations which alter the periodicity of the variations produced—in what may be called the primary circuit. A convenient arrangement for utilizing the variations is that of inserting a transformer in the circuit of a direct current source supplying the primary circuit and thus affecting the secondary of the transformer with variations produced in the primary circuit. This secondary circuit may itself transfer its effects to an ultimate receiving or utilizing circuit calculated to be of use for wireless telephonic, telegraphic or other purposes. Means may be provided for varying the frequency of the pulsations in the primary circuit by regulating the amount of current flowing and the strength of the field of force or magnetic lines.

It is readily conceivable that the path of the current in the magnetic field might be unobstructed and the electromotive-force required to pass current be uniform. In such case the current in the vapor might simply move symmetrically within the field and no energy variations would be produced. To accomplish the result aimed at by the present invention some sort of obstruction should be placed in the path of movement of the current stream in the gas or vapor and this may be brought about by causing the current passing in the vapor to rotate in an eccentric path causing an elongation and shortening of the path and may also be brought about by inclosing within the vapor container one or more obstructions which interrupt the regular continuity of the movement and cause the shortenings and elongations of the vapor path desired.

So far as this feature of causing variations in the impedance of the circuit by subjecting the current in the vapor to the effects of obstructions is concerned, the effects might be beneficially produced in various types of apparatus whether a movement be caused by magnetic lines or by other means.

I have spoken of wireless telegraphy and telephony but the system may be applied to any circuit and especially where electric variations are used, of such time period as not to be perceived by or affect the apparatus or instrument used nor of sufficient wave length to affect instruments by reason of their short time period, or the hearing by means of the apparatus, the instruments being only affected by variations in total energy transmitted by a multiplicity of waves. A secondary circuit may have the energy received by it varied if in resonance with the time period created by the device by a variation of its time period or resonance characteristics, namely, capacity, inductance or resistance. By varying the time period of the circuit controlled by means of the invention the energy transmitted to a resonant circuit of fixed time period would be varied.

Figure 2:
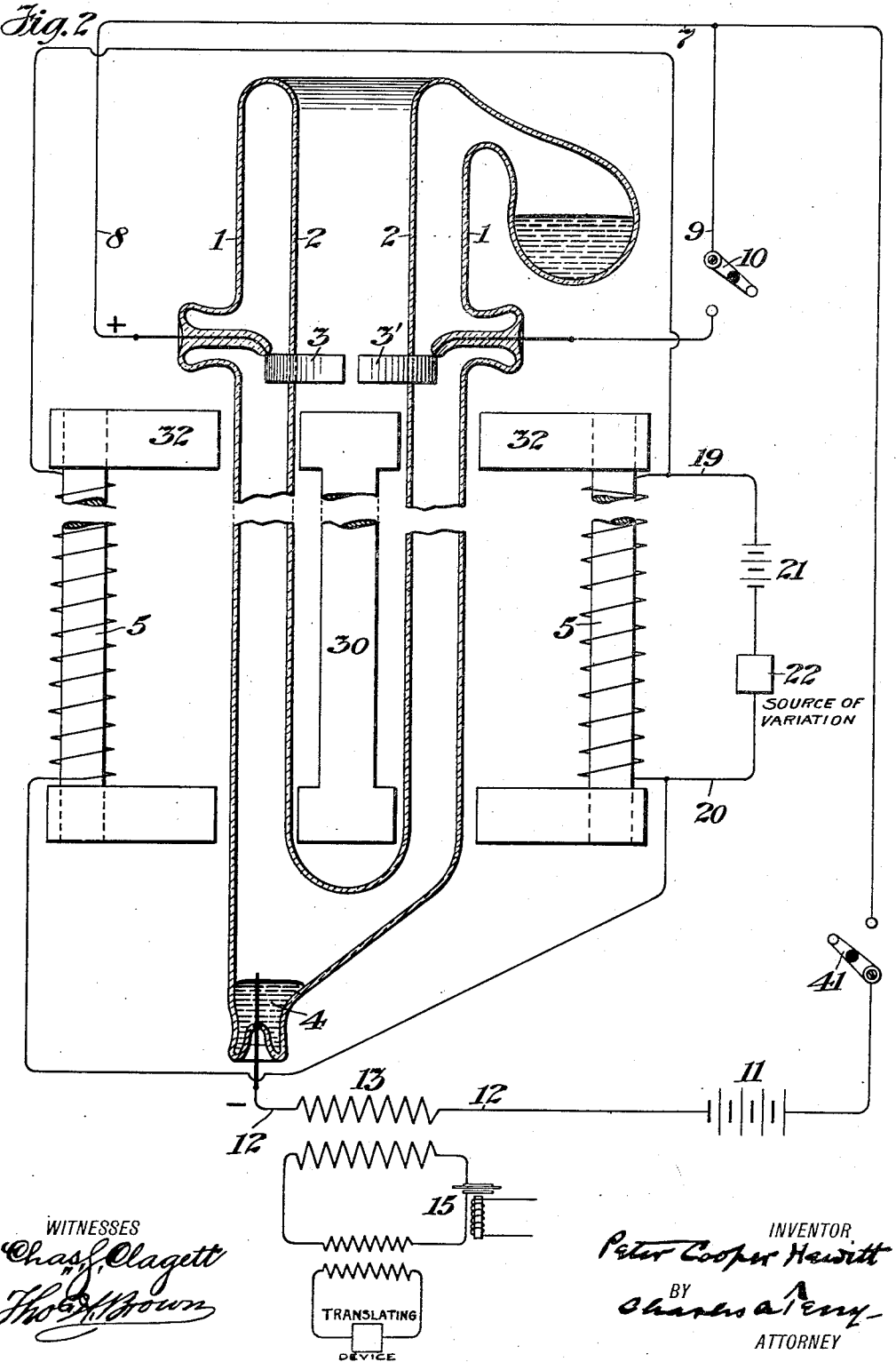
Figure 3:
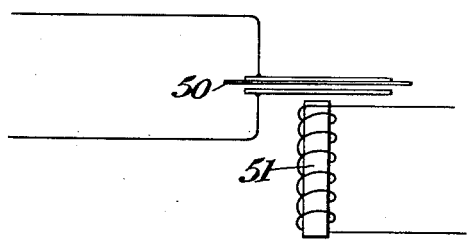
Figure 4:
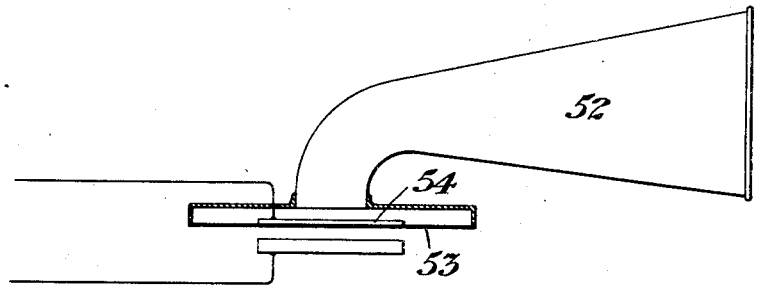

I have illustrated my invention in the accompanying drawings in which Figures 1 and 2 are diagrams of two different embodiments of my invention; and Figs. 3 and 4 are detail views illustrating modified arrangements of subsidiary circuits which may be employed in the operation of my invention.

In Fig. 1 of the drawing, 1 represents the outer and 2 the inner wall of the container. At one end thereof is located a positive electrode, 3. A negative electrode 4 of mercury or other suitable material is located at or near the opposite end.

A magnet 5, here shown as an electromagnet, has one leg projecting within the space formed by the inner wall, 2, and the other leg extending outside the outer wall, 1. The core, 30, of the said magnet has an internal pole piece, 31, and an outer pole piece, 32, located approximately opposite each other. The magnet itself may be conceived of as made up of an inner leg, 5, and an outer leg, 6.

In the drawing I have shown a direct current source 11, connected through a conductor 7 and a suitable leading in wire 8 to the electrode 3 and likewise a conductor 9 leading through a switch 10 to the electrode 3¹. The other terminal of the source 11, is connected by a conductor 12 to the electrode 4. In the circuit there is inserted the primary 13, of a transformer, the secondary of which is a coil 14 in a circuit which is resonant with the variations created in the source 23. The circuit just described may be denominated the secondary circuit, and it is here shown as interlinked with the receiving or utilization circuit, 40, by means of a coil 16 in the secondary circuit and a coil 17 in the utilization circuit. These coils are in inductive relation to each other.

Thus the variations produced in the magnetic field of force are reproduced in utilizable form in the receiving circuit 40, where they may be used for any of the purposes described herein.

At 18 are shown the ends of the coils of the magnet 5—6, and they are connected by conductors 19 and 20 to a constant source of energy 21.

Provided it is desired to vary the field of force created by the coil 18, a device 22 of any desired character, may be employed in the circuit 19—20, if such source of variation does not exist in the current supplied by the source 21. A source of variation, 23, may be supplied in the circuit of the vapor device and the direct current source 11 for causing changes in the periodicity of the variations produced in the said source 11.

It is found in practice that when an obstruction such as the inner wall or tube 2 is placed in the region occupied by the conducting gas or vapor and the vapor is then subjected to the action of a field of force supplied by a direct current source, the tendency of the magnet to cause a simple rotation of the gas or vapor, as well known in the art, is so far modified that the twisting, so to speak, of the gas or vapor instead of being uniform in a circular direction is made to cause first a lengthening and then a shortening of the vapor path, thereby varying the impedance of the vapor path of the circuit. Expressed in other words, the twisting of the vapor path around the wall 2, causes the said path to stretch itself until it reaches its limit and comes together again in a shorter path, the result being a variation of electromotive force between the terminals of the device which brings about variations of energy passing through the coil 14, thus accomplishing the transfer of energy above referred to.

The recurrence of these shortenings and elongations being uniform, a constant periodicity is given to the primary circuit which can be depended upon for reproducing constant periodical variations in circuits connected therewith.

A wireless telegraph, telephone, signaling, or power circuit, as 40, may be supplied from a primary circuit of constant periodicity with varying energy, by means of a variable capacity inserted at 15. The effect of the variable condenser or capacity will be to vary the resonance characteristics of the circuit 14 and thereby vary its absorption of energy from the coil 13 in the vapor device and therefore the energy transferred by means of it to the circuit 40. The capacity may be varied directly by sound waves, as shown in Fig. 4. This arrangement is useful as a means of amplifying electrical or other energy variation where the variations of the capacity or resonance characteristic of this intermediate member is brought about by any means.

The energy of the vapor device, when not transmitted to the resonant circuit may be consumed by the circuit of the vapor device. Through the resonant circuit large variations of energy may be transmitted from the vapor device circuit to the conductor 17 by means of apparatus in the resonant circuit for maintaining the natural period thereof constant when variations are caused by the source 23.

Similar results may be arrived at by applying means for varying the energy transmitted to the circuit of conductor 17 by availing of the natural constant time period of one circuit affecting or affected by the variable time period of another circuit by means of the resonant characteristic of the circuits.

When the second electrode 3¹ is used in combination with the electrode 3, the switch 10 is closed and the two semi-circular electrodes, being electrically connected outside the vapor container, will act substantially as a single circular electrode but with a gap for producing the obstructions mentioned above.

At 41, or elsewhere in the circuit of the source 11, I introduce a main controlling switch for closing or opening the circuit of the source 11.

These gas or vapor devices may be glass or metal and where higher temperatures are desirable they may be made of quartz.

In Fig. 2, I have shown in diagram a somewhat different embodiment of my invention. Here the pole pieces, 32, 32 and the core 30, are so arranged with relation to the magnet 5, that the lines of force between the upper poles of the magnet and the core cross the current stream in a direction opposite to those between the lower poles, whereby the current is caused to rotate in the vapor in opposite directions at the top and bottom.

In Fig. 3 I have illustrated means for varying the capacity appearing in the secondary circuit in Figs. 1 and 2. Here one of the plates of a condenser is shown as being secured to a disk 50, of suitable insulating material such as mica, suitably supported at its edge by means not shown, the other plate being arranged so as to be capable of being acted on and moved by variations of magnetic force. By means of a magnet, 51, so placed as to act upon one of the condenser plates, the capacity may be varied, depending upon the distance between the plates when one of them is influenced by the magnet or when free from such influence. The variable capacity may take the place of capacity 15.

In Fig. 4 the capacity is varied by means of sound waves which may be conveyed through a horn, 52, to a yielding disk, 53, of mica or the like on which is a conducting coating, 54, such as tin foil. Sound waves entering through the horn, 52, and impinging upon the yielding coating, 54, and its supporting disk cause it to vibrate and vary the capacity. The intermediate resonant circuit herein described may be used in like manner in connection with any other means of generating alternating currents of definite time period.

I claim as my invention:

1. The method of producing and transmitting energy variations in a circuit of which the conducting gas or vapor forms a part, which consists in affecting the current in the gas or vapor by a constant magnetic field and alternately lengthening and shortening the path of conduction through the gas or vapor by interposing an obstruction in the said path of conduction and affecting thereby electrical receiving devices in the circuit connected with the vapor path.

2. The method of producing energy variations in an electric circuit, a portion of which is mobile and has a normal current path and an interposed obstruction, which consists in moving said mobile portion around the obstruction to a point where the current naturally resumes its normal path.

3. The method of producing energy variations in an electric circuit of which a conducting gas or vapor having a normal current path forms a part, which consists in moving the current around an obstruction in said path to a point where the current naturally resumes its normal path.

4. The method of producing energy variations in an electric circuit by the mutual interaction of a constant magnetic field of force and current flowing through a gas or vapor, which consists in alternately lengthening and shortening the conducting path through the gas or vapor by interposing an obstruction in the conducting path and thereby causing variations of impedance.

5. In an electric circuit, wherein a constant magnetic field and an inclosed gas or vapor mutually interact, the method which consists in causing successive elongations and shortenings of the current path within the gas or vapor by interposing an obstruction in the current path, whereby the impedance of the circuit is varied.

6. The method of producing and transmitting electrical energy variations in a circuit of which a conducting gas or vapor forms a part, which consists in producing an eccentric path for the current flowing in the gas or vapor by interposing an obstruction in the current path, and affecting the current in the gas or vapor by constant magnetic force, so as to cause the current to rotate around said obstruction.

7. The method of producing an alternating current, which consists in subjecting direct current flowing between the electrodes of a sealed container to the influence of a constant field of force to gradually and regularly raise and lower the operating voltage of the device and lower and raise the flow of current in the device, passing the energy variations thus produced through the primary of a transformer and withdrawing alternating current from a secondary winding of the transformer whose primary winding is traversed by the current in the circuit of the sealed device.

8. The method of producing an alternating current, which consists in subjecting a direct current flowing between the electrodes of a sealed container and passing by an obstruction in said container to the influence of a constant field of force to periodically raise the operating voltage of the device and diminish the current flow therethrough, and passing the current from the device through a transformer primary.

9. In an electric circuit, a source of rapid periodic energy variations, comprising an annular chamber, a conducting gas or vapor therein, a portion of the annular chamber constituting an obstruction in the path of the gas or vapor, and a constant magnet so related thereto as to cause successive periodic lengthenings and shortenings of the conducting path through the gas or vapor.

10. In an electric circuit, a source of rapid periodic energy variations, comprising an annular chamber, a conducting gas or vapor therein, a portion of the annular chamber constituting an obstruction in the path of the gas or vapor, and a constant magnet so related thereto as to cause successive periodic lengthenings and shortenings of the conducting path through the gas or vapor, one of the poles of the said magnet being outside the exterior wall of the annular chamber and the other pole thereof being within the inner wall of the said chamber.

11. In an electric circuit, a source of rapid periodic energy variations comprising an annular chamber, a conducting gas or vapor therein, a portion of the annular chamber constituting an obstruction in the path of the gas or vapor, and a constant magnet having pole pieces of alternately opposite polarity located opposite each other at points outside the outer wall of the chamber and inside the inner wall thereof.

12. In an electric circuit, a source of rapid periodic energy variations, comprising an annular chamber, a conducting gas or vapor therein, a portion of the annular chamber constituting an obstruction in the path of the gas or vapor, and a constant magnet capable of causing the lines of force to cross the current stream in opposite directions in different parts of the chamber.

13. In an electric circuit, a constant magnet and a gas or vapor located within the field of force of the magnet and an obstruction in the gas or vapor path, the position of the field of force causing alternate lengthenings and shortenings of the conducting path through the gas or vapor and thereby causing variations of impedance.

14. In a system of electrical distribution, the combination with a direct current source, a vapor electric device having an anode and a cathode, means for establishing current flow in said vapor device, an obstruction in the path of said current flow, of means for subjecting this current to a constant deflecting force, thus periodically elongating the current path at a definite rate and means for utilizing the constant variation produced by the extension of current.

15. An exhausted vapor electric device, in combination with means for causing a flow of current in said device, an obstruction in the path of said current flow, means for periodically raising and lowering the operating voltage thereof consisting of a constant field of force, and means for producing an alternating potential from the pulsating current produced in the vapor device circuit.

16. An exhausted vapor electric device in combination with means for causing a flow of current in said device, an obstruction in the path of said current flow, means for periodically raising the operating voltage thereof consisting of a constant field of force, and diminishing the flow of current in the device in combination with a transformer primary through which the current from said device passes, and a secondary circuit operatively connected to said transformer primary.

17. The method of producing energy variations in an electric circuit by the mutual interaction of a constant magnetic field and current flowing through a gas or vapor between a positive and a negative electrode, which consists in causing an uneven movement of the current stream within the magnetic field by interposing one or more obstructions in the path of movement of the current in the gas or vapor.

18. In an electric circuit, a source of rapid periodic energy variations, comprising a constant magnet and a gas or vapor located within the field of force of said magnet, and an obstruction in the gas or vapor path, in combination with electric receiving devices in series with the gas or vapor.

19. In an electric circuit, a source of rapid periodic energy variations, comprising a constant magnet and a gas or vapor located within the field of force of said magnet, in combination with electric receiving devices in series with the gas or vapor and a source of variation in circuit with the source supplying the gas or vapor, whereby changes in the periodicity of the variations are produced.

Signed at New York in the county of New York and State of New York this 11th day of December A. D. 1913.

PETER COOPER HEWITT.

Witnesses:
Wm. H. Capel,
C. Wesley Pomeroy.